(12) United States Patent
Ogasawara et al.

(10) Patent No.: US 7,882,206 B2
(45) Date of Patent: Feb. 1, 2011

(54) STORAGE DEVICE SYSTEM AND STORAGE DEVICE SYSTEM ACTIVATING METHOD

(75) Inventors: Hiroshi Ogasawara, Odawara (JP); Yutaka Takata, Ninomiya (JP); Naotaka Kobayashi, Odawara (JP)

(73) Assignee: Hitachi, Ltd., Tokyo (JP)

( * ) Notice: Subject to any disclaimer, the term of this patent is extended or adjusted under 35 U.S.C. 154(b) by 213 days.

(21) Appl. No.: 12/348,088

(22) Filed: Jan. 2, 2009

(65) Prior Publication Data

US 2009/0157856 A1 Jun. 18, 2009

Related U.S. Application Data

(63) Continuation of application No. 10/673,162, filed on Sep. 30, 2003, now abandoned.

(30) Foreign Application Priority Data

Jan. 24, 2003 (JP) ............... 2003-015525

(51) Int. Cl.
G06F 15/177 (2006.01)
G06F 12/00 (2006.01)
G06F 11/30 (2006.01)
G06F 11/32 (2006.01)
G06F 9/455 (2006.01)
G06F 11/07 (2006.01)

(52) U.S. Cl. .............. 709/222; 711/114; 726/34; 726/35; 710/104; 713/340

(58) Field of Classification Search ............ 709/222; 711/114
See application file for complete search history.

(56) References Cited

U.S. PATENT DOCUMENTS 5,285,528 A 2/1994 Hart
5,504,873 A 4/1996 Martin et al.
5,548,724 A 8/1996 Akizawa et al.
5,659,718 A 8/1997 Osman et al.
5,671,377 A 9/1997 Bleidt et al.
5,710,881 A 1/1998 Gupta et al.
5,774,731 A 6/1998 Higuchi et al.

(Continued)

FOREIGN PATENT DOCUMENTS

JP 03-138752 6/1991

(Continued)

*Primary Examiner*—Ashok B Patel
*Assistant Examiner*—Joseph Gazda
(74) *Attorney, Agent, or Firm*—Brundidge & Stanger, P.C.

(57) ABSTRACT

A storage device system has a plurality of storage devices for storing information; a storage device control section that controls storage of information in the storage devices; and a connection unit connected to the storage device control section. Furthermore, the storage device system has a first communication control section that includes a first processor which is connected to the storage device control section via the connection unit and also connected on a first network external to the storage device system, which converts information of a first form received over the first external network into information of a second form, and which issues a request for access to the storage devices; and a second processor which accesses the storage devices via the connection unit and the storage device control section in response to the access request issued from the first processor, and which controls activation of the first processor.

19 Claims, 11 Drawing Sheets

| WORD | 31 | 24 23 | 17 16 | 8 7 | 0 |
|---|---|---|---|---|---|
| 0 | MAC ADDRESS | | | | |
| 1 | 0 PADDING AREA | | | | |
| 2 | BIOS VERSION | | | | |

U.S. PATENT DOCUMENTS

| | | | |
|---|---|---|---|
| 5,832,222 | A | 11/1998 | Dziadosz et al. |
| 5,854,905 | A * | 12/1998 | Garney ............... 710/104 |
| 5,928,327 | A | 7/1999 | Wang et al. |
| 6,006,342 | A | 12/1999 | Beardsley et al. |
| 6,078,990 | A | 6/2000 | Frazier |
| 6,105,122 | A | 8/2000 | Muller et al. |
| 6,105,136 | A | 8/2000 | Cromer et al. |
| 6,263,441 | B1 * | 7/2001 | Cromer et al. ............ 726/35 |
| 6,282,642 | B1 | 8/2001 | Cromer et al. |
| 6,286,038 | B1 | 9/2001 | Reichmeyer et al. |
| 6,499,073 | B1 * | 12/2002 | Wallach et al. .......... 713/340 |
| 6,513,097 | B1 | 1/2003 | Beardsley et al. |
| 6,880,104 | B2 | 4/2005 | Abe et al. |
| 6,990,685 | B1 * | 1/2006 | Christensen et al. ....... 726/34 |
| 7,062,595 | B2 | 6/2006 | Lindsay et al. |
| 2001/0005894 | A1 | 6/2001 | Fukui |
| 2002/0116452 | A1 | 8/2002 | Johnson et al. |
| 2002/0152339 | A1 | 10/2002 | Yamamoto |
| 2002/0178143 | A1 | 11/2002 | Fujimoto |
| 2003/0093541 | A1 | 5/2003 | Lolayekar et al. |
| 2003/0105830 | A1 | 6/2003 | Pham et al. |
| 2003/0225735 | A1 | 12/2003 | Weber |
| 2004/0139168 | A1 | 7/2004 | Tanaka et al. |
| 2004/0205294 | A1 | 10/2004 | Nakayama et al. |
| 2004/0215878 | A1 | 10/2004 | Takata et al. |

FOREIGN PATENT DOCUMENTS

| | | |
|---|---|---|
| JP | 06-161974 | 6/1994 |
| JP | 11-272635 | 10/1999 |
| JP | 2002-351703 | 12/2002 |

* cited by examiner

PHYSICAL DISK MANAGEMENT TABLE

| DISK NUMBER | STORAGE CAPACITY | RAID | USE SITUATION |
|---|---|---|---|
| #001 | 100GB | 5 | USED |
| #002 | 100GB | 5 | USED |
| #003 | 100GB | 5 | USED |
| #004 | 100GB | 5 | USED |
| #005 | 100GB | 5 | USED |
| #006 | 50GB | — | UNUSED |
| ⋮ | ⋮ | ⋮ | ⋮ |

LU MANAGEMENT TABLE

| LU NUMBER | PHYSICAL DISK | STORAGE CAPACITY | RAID |
|---|---|---|---|
| #1 | #001, #002, #003, #004, #005 | 100GB | 5 |
| #2 | #001, #002, #003, #004, #005 | 300GB | 5 |
| #3 | #006, #007, | 200GB | 1 |
| ⋮ | ⋮ | ⋮ | ⋮ |

FIG.9

METADATA

730

| FILENAME | LEADING ADDRESS | STORAGE CAPACITY | OWNER | TIME INSTANT OF UPDATE |
|---|---|---|---|---|
| A | 7BSA | 200MB | X | 0:00 |
| B | 05BF | 50MB | X | 7:57 |
| C | 1F30 | 100MB | Y | 9:15 |
| D | 470B | 100MB | Z | 15:20 |
| ⋮ | ⋮ | ⋮ | ⋮ | ⋮ |

FILE LOCK TABLE

| FILENAME | LOCKING STATE |
|---|---|
| A | LOCKED |
| B | — |
| C | — |
| D | LOCKED |
| ⋮ | ⋮ |

722

LU LOCK TABLE

| LU | LOCKING STATE |
|---|---|
| COMMON | — |
| 1 | LOCKED |
| 2 | — |
| ⋮ | ⋮ |

| WORD | 31      24 | 23      17 | 16      8 | 7      0 |
|---|---|---|---|---|
| 0 | DIAGNOSIS EXECUTION FLAG | (RESERVED) | TYPE OF ACTIVATED DEVICE ||
| 1 | DRIVE NUMBER 1 ||  DRIVE NUMBER 0 ||
| 2 | TIME INSTANT INFORMATION ||||
| 3 | (RESERVED) || NUMBER OF COMMAND RETRIES | COMMAND TIMEOUT VALUE |
| 4 | TEMPERATURE INFORMATION 3 | TEMPERATURE INFORMATION 2 | TEMPERATURE INFORMATION 1 | TEMPERATURE INFORMATION 0 |

FIG. 17

| PROCE-DURE | CPU | I/O PROCESSOR | MANAGEMENT TERMINAL | STORAGE DEVICES |
|---|---|---|---|---|
| 1 | SUPPLYING POWER | SUPPLYING POWER | SUPPLYING POWER | SUPPLYING POWER |
| 2 | ACTIVATING BIOS | INITIALIZING HARDWARE | ACTIVATING TERMINAL | ALLOWING DISK DRIVES TO START SPINNING DISKS |
| 3 | WAITING FOR DIRECTIVE SENT FROM I/O PROCESSOR | | | |
| 4 | STARTING HARDWARE DIAGNOSIS | DIAGNOSIS START REQUEST | | |
| 5 | TERMINATING HARDWARE DIAGNOSIS | | | |
| 6 | STORING MAC ADDRESS | | | |
| 7 | RE-SUPPLYING POWER | RESETTING CPU | | |
| 8 | ACTIVATING BIOS | | | DISK DRIVES COMPLETE SPINNING DISKS |
| 9 | WAITING FOR DIRECTIVE SENT FROM I/O PROCESSOR | | | |
| 10 | | | ACQUIRING MAC ADDRESS | |
| 11 | | | DETERMINING NUMBER OF RETRIES, RETRY TIMEOUT VALUE, TYPE OF ACTIVATED DEVICE (NETWORK BOOT) | |
| 12 | | VERIFYING WHETHER DISK DRIVES HAVE SPUN DISKS | | |
| 13 | | DETECT WHETHER DISK DRIVES HAVE COMPLETED SPINNING DISKS | | |
| 14 | | STORE TEMPERATURE INFORMATION, NUMBER OF RETRIES, RETRY TIMEOUT VALUE, DIAGNOSIS EXECUTION FLAG (DIAGNOSIS TO BE SKIPPED OR NOT), AND TYPE OF ACTIVATED DEVICE (NETWORK BOOT) | | |
| 15 | DETECT WHETHER CPU IS DIRECTED TO CONTINUE PROCESSING | CPU PROCESSING CONTINUATION DIRECTIVE | | |
| 16 | ACQUIRE TEMPERATURE INFORMATION, NUMBER OF RETRIES, RETRY TIMEOUT VALUE, DIAGNOSIS EXECUTION FLAG, AND TYPE OF ACTIVATED DEVICE | | | |
| 17 | START NETWORK BOOTING | | | |
| 18 | ISSUING NETWORK BOOTING REQUEST | | RECEIVING NETWORK BOOTING REQUEST | |
| 19 | STARTING INSTALLING OS (NETWORK BOOTING CLIENT) | | TRANSFERRING OS (NETWORK BOOTING SERVER) | |
| 20 | TRANSFERRING OS IMAGE | | | |
| 21 | NOTIFYING COMPLETION OF INSTALLATION | SENSING INSTALLATION COMPLETION NOTIFICATION | | |
| 22 | RE-SUPPLYING POWER | RESETTING CPU | | |
| 23 | ACTIVATING BIOS | | | |
| 24 | WAITING FOR DIRECTIVE SENT FROM I/O PROCESSOR | | | |
| 25 | | STORING TIME INSTANT INFORMATION, TYPE OF ACTIVATED DEVICE (DISK), AND DRIVE NUMBER | | |
| 26 | DETECTING WHETHER CPU IS DIRECTED TO CONTINUE PROCESSING | CPU PROCESSING CONTINUATION DIRECTIVE | | |
| 27 | ACQUIRING TIME INSTANT INFORMATION | | | |
| 28 | STARTING BOOTING DISK | | | |
| 29 | LOADING OS | | | |
| 30 | ACTIVATING OS | | | |
| 31 | NORMAL OPERATION | | | |

STORAGE DEVICE SYSTEM AND STORAGE DEVICE SYSTEM ACTIVATING METHOD

This application is a continuation of U.S. patent application Ser. No. 10/673,162, filed Sep. 30, 2003, which is now abandoned, which claims priority to foreign Japanese Application No. 2003-015525, filed Jan. 24, 2003, Japan and which is hereby incorporated herein by reference.

BACKGROUND OF THE INVENTION

The present invention relates to a novel storage device system that is capable of being connected on a plurality of different types of networks, and, more particularly, to a method of controlling activation of the storage device system.

In recent years, the amount of data being treated by a computer system has rapidly increased. In order to efficiently utilize and manage such an abundant amount of data, a technology has been developed for connecting a system, including a disk array composed of a plurality of disk drives (hereinafter, a storage device system), to an information processing system over a leased line network (or a storage area network (SAN)) so as to realize fast access to a large amount of information that is stored in the storage device system. In order to realize fast data transfer by connecting the storage device system to the information processing system over the SAN, communications equipment conformable to a fibre channel protocol is generally used to construct a network.

On the other hand, a network system of the type referred to as a network attached storage (NAS) has been developed for realizing access, at a file level, to a storage device system by interconnecting the storage device system that includes a plurality of storage devices and an information processing system over a network that adopts a TCP/IP (which stands for transmission control protocol/Internet protocol) protocol. Within the NAS, since a system having the capability of a file system is connected to the storage device system, the information processing system can gain file-level access to the storage device system. Recently, a large-scale NAS accommodating a storage device system, which is managed on the basis of a RAID (redundant arrays of inexpensive disks) technology and includes a file system, is attracting attention because it provides an enormous storage resource, which has been referred to as a midrange-class or enterprise-class resource.

Patent Document 1: Japanese Unexamined Patent Application Publication No. 2002-351703

However, the conventional NAS is realized by connecting an information processing system, which has a TCP/IP communication feature and the capability of a file system, to a storage device system that has neither the TCP/IP communication feature nor the capability of a file system. An installation space for the connected information processing system is therefore needed. Moreover, the information processing system and storage device system are often interconnected over a SAN because of the need for fast communication. Communication control equipment and a communication control feature, therefore, must be included.

SUMMARY OF THE INVENTION

Accordingly, a main object of the present invention is to provide a novel storage device system, which is capable of being connected to a plurality of different types of networks, and to provide a storage device control system and a method of controlling activation of the storage device system, which are needed to implement the storage device system.

A storage device system in accordance with the present invention comprises: a plurality of storage devices in which information is stored; a storage device control section that controls storage of information in the plurality of storage devices; and a connection unit connected to the storage device control section. The storage device system further comprises a first communication control section including: a first processor that is connected on a first network external to the storage device system, that converts information of a first form, which is received over the first external network, into information of a second form, and that issues a request for access to the plurality of storage devices; and a second processor that accesses the plurality of storage devices via the connection unit and storage device control section in response to the access request issued from the first processor, and that controls activation of the first processor.

BRIEF DESCRIPTION OF THE DRAWINGS

FIG. 9 is a diagram which shows metadata employed in the embodiment;

FIG. 10 is a diagram which shows lock data employed in the embodiment;

FIG. 17 is a flowchart illustrating activation and installation operations performed in the storage device system in accordance with the embodiment.

DESCRIPTION OF THE PREFERRED EMBODIMENTS

Figure 1:
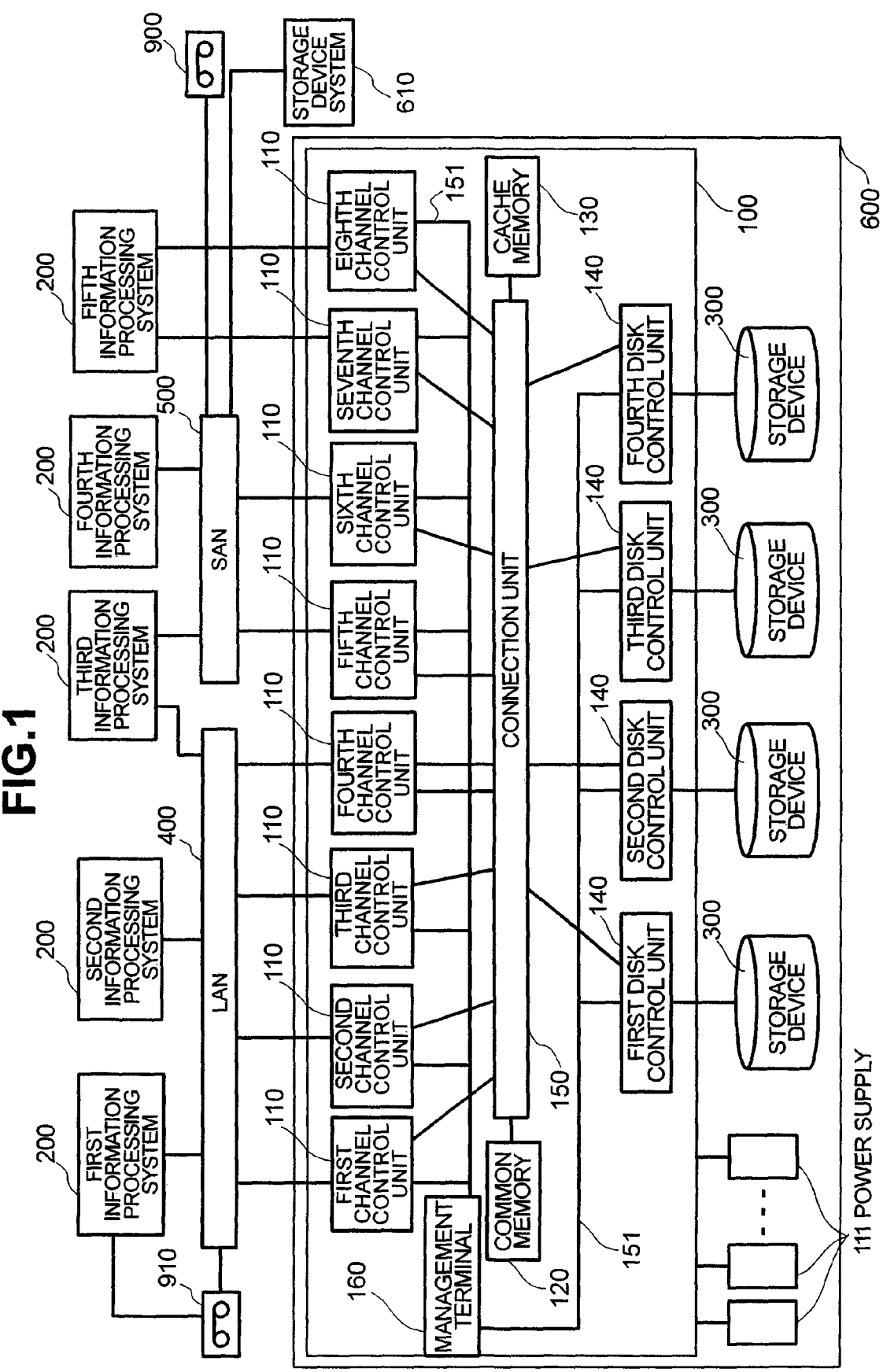
FIG. 1 is a block diagram showing the overall configuration of a storage device system in accordance with an embodiment of the present invention.

Referring to the drawings, an embodiment of the present invention will be described below.

FIG. 1 is a block diagram showing the overall configuration of a storage device system in accordance with an embodiment of the present invention.

Example of Overall Configuration

A storage device system 600 has a storage device control system 100 and storage devices 300. The storage device control system 100 controls the storage devices 300 according to a command received from any one of a plurality of information processing systems 200. For example, when the storage device system 100 receives an input/output request for data from any of the information processing systems 200, it performs processing for the purpose of receiving or transmitting data stored in the storage devices 300. Data is stored in a logical volume or logical unit (LU), that consists of a storage area logically defined in a physical storage area provided by a disk drive included in each of the storage devices 300. Moreover, the storage device control system 100 transfers various commands, which are used to manage the storage device system 600, to or from the information processing systems 200.

Power supplies 111 supply power to the storage device system 600, and they consist of batteries connected to an external power supply. A plurality of power supplies are mounted in the storage device system for the purpose of redundancy. Specifically, the storage device system 600 is physically divided into two or more power supply groups in terms of power supply. When the storage device system 600 is divided into, for example, two power supply groups, first to fourth channel control units 110 belong to a first power supply group, and fifth to eighth channel control units 110 belong to a second power supply group. All redundant components of the storage device system 600 are classified into two or more power supply groups. Moreover, components belonging to a group of redundant components are designed not to belong to the same power supply group. Moreover, the power supplies 111 are divided into two or more groups. Power is supplied from an external power supply to the two or more groups of power supplies 111 over independent cables. The two or more groups of power supplies 111 supply power to the assigned groups of power supplies. Moreover, the two or more groups of power supplies 111 each include a plurality of power supplies. Since the storage device system 600 has redundancy, if a certain power supply breaks down, the storage device system 600 can keep operating. Furthermore, even if the external power supply to the two or more groups of power supplies 111 is discontinued, the storage device system 600 can keep operating.

The information processing systems 200 are computers each having a central processing unit (CPU) and a memory. The CPU included in each of the information processing systems 200 runs various programs, whereby various features are implemented. The information processing systems 200 may be, for example, personal computers, workstations, or main frame computers.

Referring to FIG. 1, the first to third information processing systems 200 are connected to the storage device control system 100 over a local area network (LAN) 400. The LAN 400 may be the Internet or a leased line network. Communications over the LAN 400 between the first to third information processing systems 200 and the storage device control system 100 are carried out based on, for example, a TCP/IP protocol. The first to third information processing systems 200 transmit a data access request (data input/output request for requesting data in units of a file) (hereinafter, a file access request) to the storage device system 600 while designating a filename.

A backup device 910 is connected on the LAN 400. The backup device 910 is a disk device, such as a magneto-optical disk (MO), CD-rewritable (CD-R) disk, or DVD-RAM, or a tape device, such as a digital audio tape (DAT) cartridge, cassette tape, open tape, or cartridge tape. When the information processing system communicates with the storage device control system 100 over the LAN 400, a backup of data stored in the storage devices 300 is stored in the backup device 910. The backup device 910 may be connected to the first information processing system 200. In this case, backup data of data stored in the storage devices 300 can be acquired via the first information processing system 200.

The storage device control system 100 includes first to fourth channel control units 110. The storage device control system 100 uses the first to fourth channel control units 110 to receive file access requests issued from the first to third information processing systems 200, respectively, over the LAN 400. Specifically, a network address (for example, IP address) on the LAN 400 is assigned to each of the first to fourth channel control units 110. The first to fourth channel control units behave as if to be independent network attached storage (NAS) devices, which can independently provide the first to third information processing systems 200 with NAS service. Hereinafter, the first to fourth channel control units 110 will be referred to as channel control units CHN110. Thus, the storage device system 600 includes first to fourth channel control units 110 that independently provide NAS service, which NAS servers that are conventionally realized with independent computers are integrated into the one storage device system 600. Consequently, the storage device system 600 can be managed as a whole. Maintenance work including determination or control of various settings, life management, and version management can be efficiently carried out.

Power is supplied from the power supplies 111 to the channel control units 110 via the storage device control system 100. Since the channel control units 110 can be dismounted from the storage device control system 100, power supply to the channel control units 110 is discontinued by physically removing the channel control units 110 from the storage device control system 100. Moreover, when the channel control units 110 are mounted in the storage device control system 100, power supply to the channel control units 110 is enabled. The channel control units 110 have a power supply circuit. When the power supply circuit is controlled by running a program implemented by a plurality of LSIs mounted on each of the channel control units 110, power supply to the circuit elements incorporated in the channel control unit can be started or discontinued.

Each of the first to fourth channel control units 110 included in the storage device control system 100 of the present embodiment is realized with hardware formed on circuit boards that are integrated into a unit; and software including an operating system (OS) to be run by the hardware, and an application program to be run on the OS or an executable object code to be executed by the hardware. In the storage device system 600 of the present embodiment, features that are conventionally implemented by a part of the hardware are realized by software. The storage device system 600 of the present embodiment can therefore be operated flexibly and meet diverse and varied users' needs so as to provide a delicate service.

The third and fourth information processing systems 200 are connected to the storage device control system 100 via a storage area network (SAN) 500. The SAN 500 is a network over which data is transferred in units of a block, which is a management unit of data stored in the storage areas offered by each of the storage devices 300, between the storage devices 300 and the third and fourth information processing systems 200. Communications over the SAN 500 between the third and fourth information processing systems 200 and the storage device control system 100 are based generally on a fibre channel protocol. The third and fourth information processing systems transmit a data access request (hereinafter, block access request), which requests access to data in units of a block, to the storage device system 600 according to the fibre channel protocol.

A backup device 900 supporting the SAN is connected to the SAN 500. When the information processing system communicates with the storage device control system 100 over the SAN 500, backup data of data stored in the storage devices 300 is stored in the backup device 900 supporting the SAN.

The fifth information processing system 200 is connected to the storage device control system 100 without the intervention of a network such as the LAN 400 or SAN 500. The fifth information processing system 200 may be formed with, for example, a main frame computer. Communications between the fifth information processing system 200 and storage device control system 100 are based on a communications protocol, for example, the FICON (which stands for fibre connection)®, ESCON (which stands for enterprise system connection)®, ACONARC (which stands for advanced connection architecture)®, or FIBARC (which stands for fibre connection architecture)®. The fifth information processing system 200 transmits a block access request to the storage device system 600 according to the communications protocol.

The storage device control system 100 communicates with the fifth information processing system 200 using the seventh and eighth channel control units 110. Hereinafter, the seventh and eighth channel control units 110 will be referred to as channel control units CHA110.

A storage device system 610 located at a remote place (secondary site) away from the installation site (primary site) of the storage device system 600 is connected on the SAN 500. The storage device system 610 is utilized as a system into which data is copied by a replication or remote copy feature that will be described later. The storage device system 610 may be connected to the storage device system 600 over a communication network such as the SAN 500 or an ATM (which stands for asynchronous transfer mode) network. In this case, for example, channel control units 110 having an interface (channel extender) that permits use of the communication network are adopted as the channel control units 110.

(Storage Device)

The storage devices 300 include numerous disk drives (physical disks), and they provide the information processing systems 200 with a storage area. Data is stored in a logical unit (LU) that consists of a storage area logically defined on a physical storage area provided by the disk drives. As the disk drives, any of various disk drives including, for example, a hard disk drive, a flexible disk dive, and a semiconductor storage device can be adopted. The storage devices 300 may be formed with a disk array composed of a plurality of disk drives. In this case, the storage area provided for the information processing systems 200 is formed with a plurality of disk drives managed as a redundant array of inexpensive disks (RAID).

The storage device control system 100 and the storage devices 300, as shown in FIG. 1, may be directly connected to each other, or they may be connected to each other over a network. Furthermore, the storage devices 300 may be designed as an integral part of the storage device control system 100.

The LUs offered by the storage devices 300 includes a user LU that is accessible to the information processing systems 200 and a system LU for use in controlling the channel control units 110. An OS to be run in the channel control units CHN110 is also stored in the system LU. Moreover, the channel control units 110 are associated with the LUs. In other words, accessible LUs are determined for the respective channel control units 110. Otherwise, the plurality of channel control units 110 may share the same LU. Hereinafter, the user LU and system LU may be called a user disk and a system disk, respectively.

(Storage Device Control System)

The storage device control system 100 comprises the channel control units 110, a common memory 120, a cache memory 130, disk control units 140, a management terminal 160, and a connection unit 150.

The channel control units 110 include a communication interface through which the channel control units communicate with the information processing systems 200, and they have the capability to transfer a data input/output command to or from the information processing systems 200. For example, the channel control units CHN110 receive a file access request from the first to third information processing systems 200. Consequently, the storage device system 600 provides the first to third information processing systems 200 with NAS service. The channel control units CHF110 that refer to the fifth and sixth channel control units receive a block access request conformable to the fibre channel protocol from the third and fourth information processing systems 200. Consequently, the storage device system 600 provides the third and fourth information processing systems 200 with a data storage service permitting fast access. Moreover, the channel control units CHA110 receive a block access request, which conforms to the FICON, ESCON, ACONARC, or FIBARC protocol, from the fifth information processing system 200. Consequently, the storage device system 600 provides a mainframe computer, such as the fifth information processing system 200, with data storage service.

The channel control units 110 are interconnected together with the management terminal 160 over the internal LAN 151. Consequently, a microprogram or the like to be run by the channel control units 110 can be transmitted from the management terminal 160 and installed in the channel control units. The configuration of the channel control units 110 will be detailed later.

The connection unit 150 is connected to the channel control units 110, common memory 120, cache memory 130, and disk control units 140. Transfer of data or a command among the channel control units 110, common memory 120, cache memory 130, and disk control units 140 is achieved via the connection unit 150. The connection unit 150 is formed with, for example, a switch, such as a super-fast crossbar switch, that suits data transmission because of its fast switching, or a bus. Since the channel control units 110 are interconnected via the switch, compared with the conventional configuration that in which NAS servers realized with respective computers are interconnected over a LAN, the efficiency in communications among the channel control units 110 has greatly improved. Moreover, fast file sharing and fast failover can be achieved.

The common memory 120 and cache memory 130 are storage memories that are shared by the channel control units 110 and disk control units 140. The common memory 120 is used mainly to store control information and commands, while the cache memory 130 is used mainly to store data.

For example, assume that a data input/output command that has been received by a certain channel control unit 110 from a certain information processing system 200 is a Write command. In this case, the channel control unit 110 writes the Write command in the common memory 120, and writes written data, which has been received from the information processing system 200, in the cache memory 130. On the other hand, the disk control units 140 monitor the common memory 120. When the disk control units 140 detect that the Write command has been written in the common memory 120, the disk control units 140 read the written data from the cache memory 130 in response to the command and write the data in the storage devices 300. Moreover, for example; assume that a data input/output command a certain channel control unit 11 has received from a certain information processing system 200 is a Read command. In this case, the channel control unit 110 writes the Read command in the common memory 120, and reads data, which is requested with the Read command sent from the information processing system 200, from the cache memory 130. If data requested with the Read command is not written in the cache memory 130, the channel control unit 110 or disk control units 140 read the data, which is requested with the Read command, from the storage devices 300, and writes the data in the cache memory 130.

In the foregoing present embodiment, the common memory 120 and cache memory 130 are included independently of the channel control units 110 and disk control units 140. The present embodiment is not limited to this mode. Alternatively, the common memory 120 and cache memory 130 may be broken up and distributed into the channel control units 110 and disk control units 140. In this case, the connection unit 150 connects the channel control units 110 and disk control units 140 which include the distributed portions of the broken up common memory and cache memory.

The disk control units 140 control the storage devices 300. For example, as mentioned above, the disk control units 140 write data in the storage devices 300 in response to a data write command that any of the channel control units 110 has received from any of the information processing systems 200. Moreover, the disk control units 140 convert a data access request, which is transmitted from any of the channel control units 110 and requests access to an LU by designating the logical address of the LU, into a data access request that requests access to a physical disk by designating the physical address of the physical disk. If the physical disks included in the storage devices 300 are managed as a RAID, data is accessed according to the principle of the RAID. Moreover, the disk control units 140 extend control to manage a duplicate of data stored in the storage devices 300 or create a backup thereof. The disk control units 140 extend control so as to store a duplicate of data stored in the storage device system 600 located at the primary site into the other storage device system 610 located at the secondary site (replication or remote copy) for the purpose of preventing loss of data in case of a disaster.

The disk control units 140 are interconnected together with the management terminal 160 over a communication network, such as the internal LAN 151, and, therefore, they can communicate with one another. Consequently, a microprogram or the like to be run by the disk control units 140 can be transmitted from the management terminal 160 and installed in the disk control units 140. The configuration of the disk control units 140 will be described later.

(Management Terminal)

The management terminal 160 is a computer that maintains or manages the storage device system 600. By handling the management terminal 160, the arrangement of physical disks can be determined, an LU to be employed can be designated, and a microprogram to be run in the channel control units 110 can be installed. Herein, by saying that the arrangement of physical disks included in the storage devices 300 can be determined, it is meant that, for example, the number of physical disks can be increased or decreased, or the RAID levels can be changed (from RAID level 1 to RAID level 5). Furthermore, the management terminal 160 can be used to check the operating state of the storage device system 600, to locate a broken region, to install an OS to be run by the channel control units 110, or to perform any other work. Moreover, the management terminal 160 is connected to an external maintenance center over a LAN or a telephone line. The management terminal 160 can therefore be used to monitor if a failure occurs in the storage device system 600 or to immediately cope with a failure. Occurrence of a failure is indicated by, for example, an OS, an application program, or driver software. The notification of the failure is performed based on the HTTP protocol or simple network management protocol (SNMP), or by electronic mail. The above-mentioned determination or extension of control is directed by an operator using as a user interface a Web page provided by a Web server realized with the management terminal 160. The operator or the like handles the management terminal 160 so as to determine an object of failure monitoring or the contents thereof or to determine a failure notification destination.

The management terminal 160 may be incorporated in the storage device control system 100 or it may be disposed externally. Moreover, the management terminal 160 may be formed with a computer dedicated to maintenance or management of the storage device control system 100 and storage devices 300, or it may be formed with a general-purpose computer provided with a maintenance/management feature.

Figures 2, 3, 4:
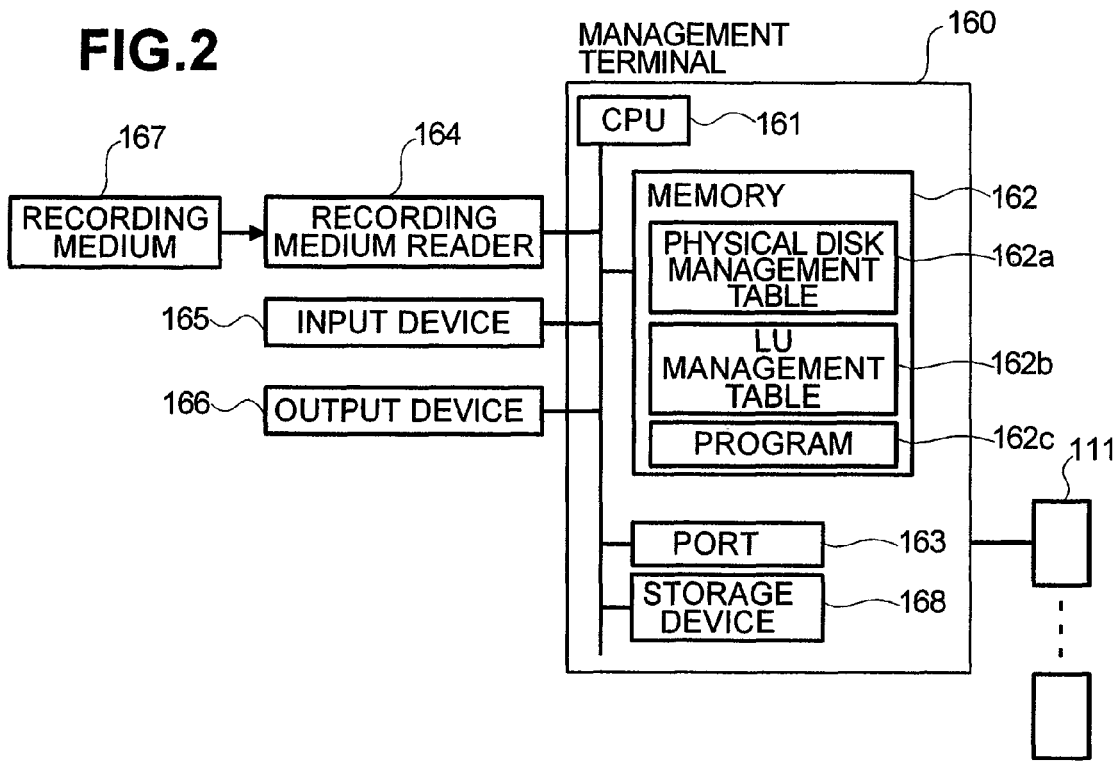
FIG. 2 is a block diagram showing the configuration of a management terminal included in the embodiment.
FIG. 3 is a diagram which shows a physical disk management table employed in the embodiment.
FIG. 4 is a diagram which shows an LU management table employed in the embodiment.

FIG. 2 is a block diagram showing the configuration of the management terminal 160.

The management terminal 160 comprises a CPU 161, a memory 162, a port 163, a recording medium reader 164, an input device 165, an output device 166, and a storage device 168.

The CPU 161 is responsible for control of the entire management terminal 160. When a program 162c stored in the memory 162 is run, the CPU 161 implements the capability of a Web server. A physical disk management table 162a, an LU management table 162b, and the program 162c are also stored in the memory 162.

The physical disk management table 162a is a table used to manage physical disks (or disk drives) included in the storage devices 300. FIG. 3 shows an example of the physical disk management table 162a, which lists physical disks bearing disk numbers 001 to 006 among numerous physical disks included in the storage devices 300. A storage capacity, a RAID level, and a use situation are specified relative to each, physical disk.

The LU management table 162b is a table used to manage LUs that are logically defined on the physical disks. FIG. 4 shows an example of the LU management table 162b, which lists LUs bearing LU numbers 1 to 3 among numerous LUs defined on the storage devices 300. A physical disk number, a storage capacity, and a RAID level are specified relative to each LU.

The recording medium reader 164 is a device for reading a program or data from a recording medium 167. The read program or data is stored in the memory 162 or storage device 168. Consequently, when the program 162c is recorded in the recording medium 167, it can be read from the recording medium 167 using the recording medium reader 164 and stored in the memory 162 or storage device 168. A flexible disk, a CD-ROM, or a semiconductor memory can be adopted as the recording medium 167. The recording medium reader 162 may be incorporated in the management terminal 160. The storage device 168 is, for example, a hard disk drive, a flexible disk drive, or a semiconductor storage device. An operator or the like uses the input device 165 to enter data that is transferred to the management terminal 160. For example, a keyboard or a mouse is adopted as the input device 165. The output device 166 is, a device for transmitting information to the outside. For example, a display or printer is adopted as the output device 166. The port 163 is connected on the internal LAN 151, whereby the management terminal 160 can communicate with the channel control units 110 or disk control units 140. Moreover, the port 163 may be connected on the LAN 400 or connected on a telephone line.

As described in conjunction with FIG. 1, the management terminal 160 is connected to the power supplies 111. Power is supplied from the power supplies 111 to the management terminal 160.

(Appearance)

Figure 5:
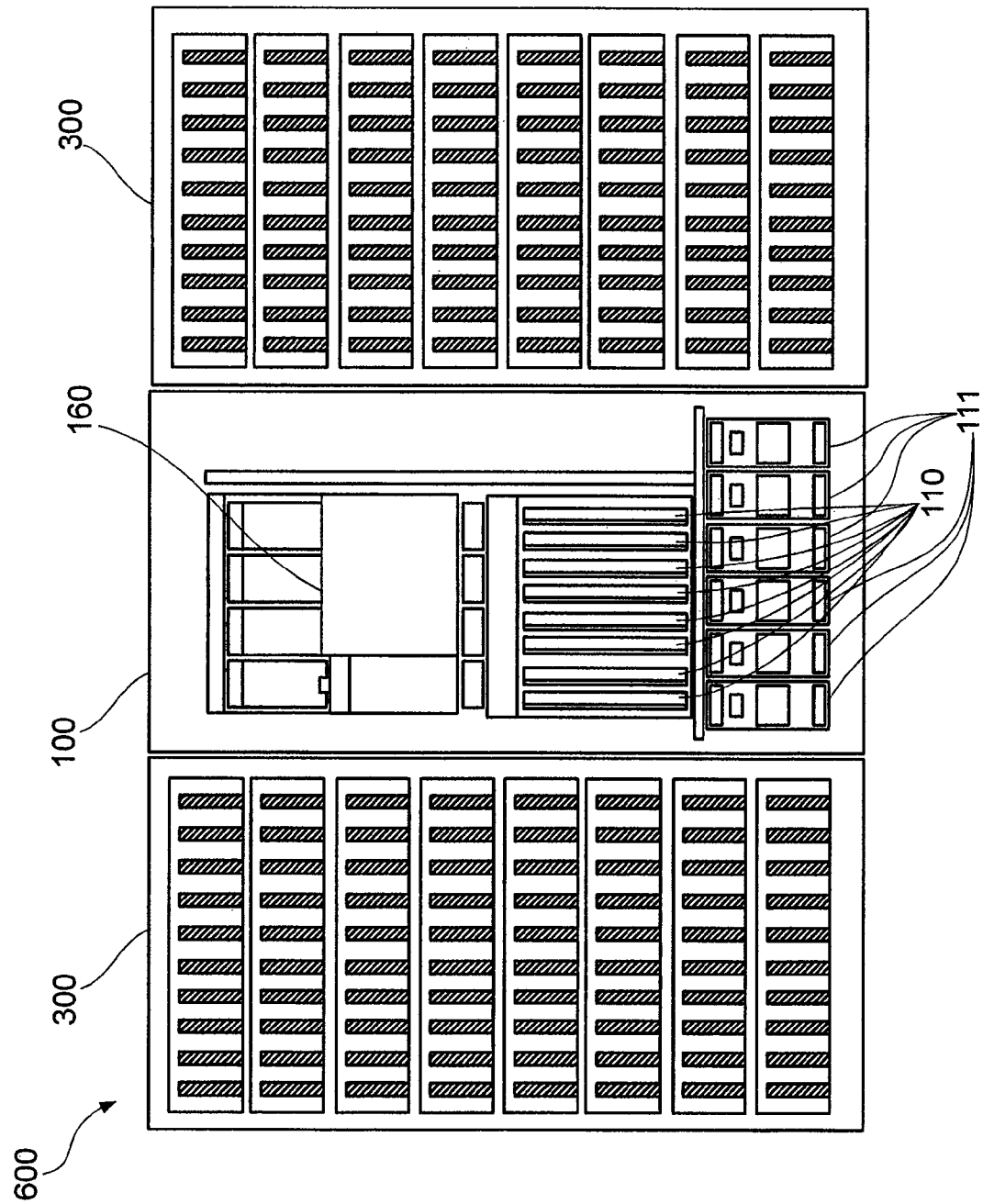
FIG. 5 is a front view which shows the appearance of the storage device system in accordance with the embodiment.
Figure 6:
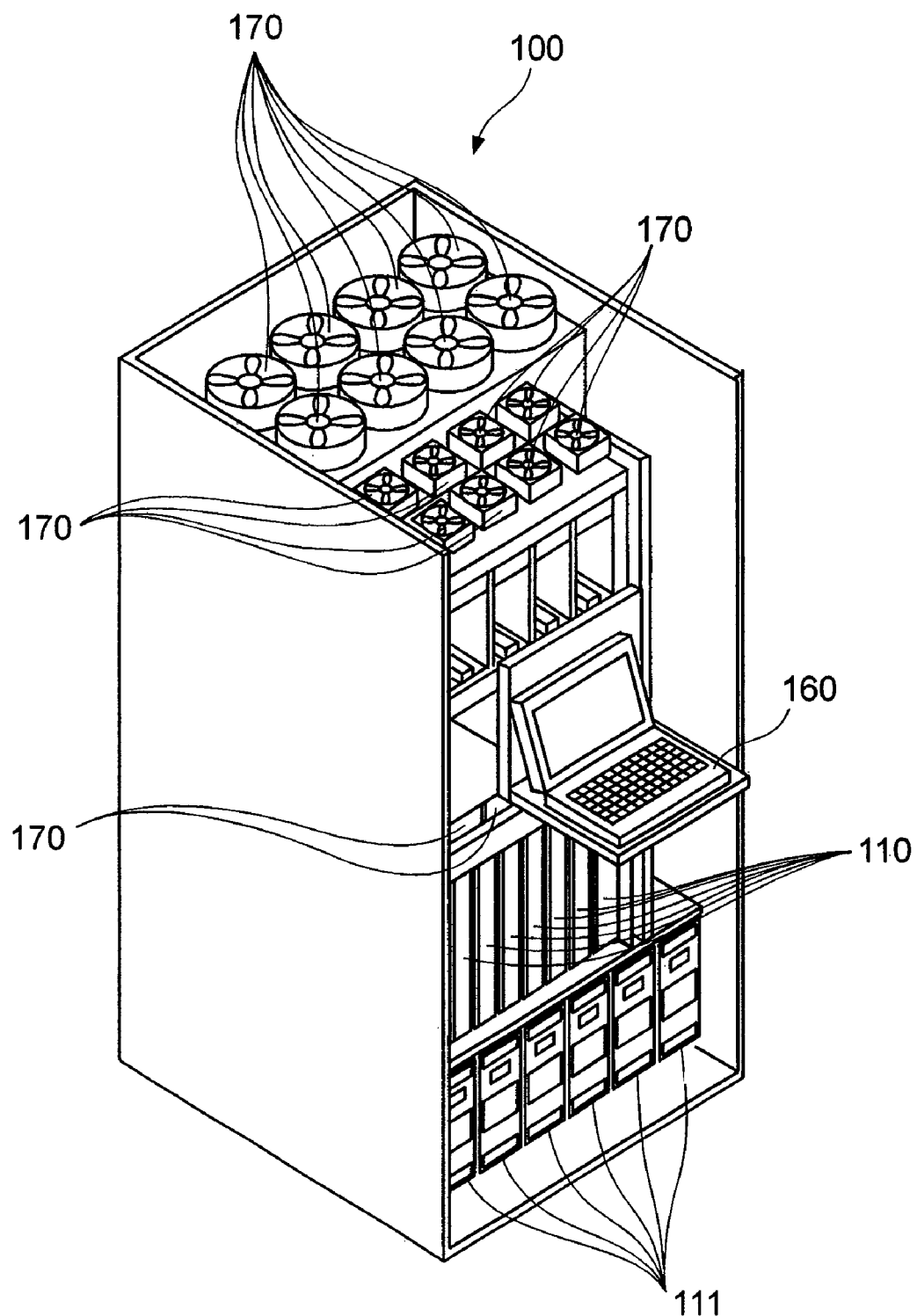
FIG. 6 is a perspective view which shows the appearance of a storage device control system included in the embodiment.

FIG. 5 shows the appearance of the storage device system 600 in accordance with the present embodiment. FIG. 6 shows the appearance of the storage device control system 100.

As shown in FIG. 5, in the storage device system 600 in accordance with the present invention, the storage device control system 100 and storage devices 300 are provided in respective housings. The housings accommodating the storage devices 300 are located on both sides of the housing accommodating the storage device control system 100.

The storage device control system 100 has the management terminal 160 located in the center of the face thereof. The management terminal 160 is shielded with a cover. As shown in FIG. 6, when the cover is opened, the management terminal 160 becomes usable. The management terminal 160 shown in FIG. 6 is formed as a so-called notebook personal computer. Alternatively, the management terminal 160 may have any other form.

Slots in which the channel control units 110 are inserted are formed below the management terminal 160. Circuit boards in which the channel control units 110 are implemented are inserted in the slots. The storage device system 600 in accordance with the present embodiment has, for example, eight slots. Referring to FIG. 5 and FIG. 6, guide rails are formed so that the channel control units 110 can be smoothly inserted in the eight slots. When the channel control units 110 are inserted in the slots along the guide rails, the channel control units 110 are mounted in the storage device control system 100. Moreover, the channel control units 110 that are inserted in the slots can be pulled forward along the guide rails and thus removed. Moreover, connectors through which the channel control units 110 are electrically connected to the storage device control system 100 are located at the front end in the depth direction of the slots. The channel control units 110 include the channel control units CHN110, CHF110, and CHAL110. The channel control units 110 are interchangeable in terms of size, the locations of the connectors, and the pin configurations of the connectors. Any of the channel control units 110 can be mounted in the eight slots. Consequently, for example, the channel control units CHN110 may be mounted in all of the eight slots. Otherwise, for example, as shown in FIG. 1, four channel control units CHN110, two channel control units CHF110, and two channel control units CHA110 may be mounted in the eight slots. Moreover, a slot in which no channel control unit 110 is mounted may be included.

As mentioned above, the channel control units 110 are provided as circuit boards that can be mounted in the slots, that is, identical units. Each of the identical units may be composed of a plurality of circuit boards. Namely, even if a unit is composed of a plurality of circuit boards, as long as the circuit boards are interconnected and integrated into a unit and can be mounted all together in a slot formed in the storage device control system 100, the unit is encompassed in the concept of one identical circuit board.

The other components of the storage device control system 100, including the disk control units 140 and common memory 120, are mounted on the back of the storage device control system 100, though they are not shown in FIG. 5 and FIG. 6.

Moreover, the storage device control system 100 includes fans 170 that are used to release heat dissipated from the channel control units 110. The fans 170 are located on the top of the storage device control system 100, and they are also disposed above the slots of the channel control units 110.

By the way, a system and a device having conventional configurations and being sold as, for example, SAN products can be utilized as the storage device control system 100 and the storage devices 300 which are mounted in the housings. In particular, when the connectors of the channel control units CHN110 are shaped so that the channel control units can be mounted in the slots formed in a conventional housing as they are, the existing system can be utilized readily. Namely, the storage device system 600 of the present embodiment can be constructed readily by utilizing existing products.

According to the present embodiment, the channel control units CHN110, CHF110, and CHA110 coexist in the storage device system 600. Consequently, a storage device system that is capable of being connected on different types of networks can be constructed. Specifically, the storage device system 600 is connected on the LAN 400 using the channel control units CHN110, and it is connected on the SAN 500 using the channel control units CHF110, and, therefore, it can be called an SAN/NAS-integrated storage device system.

(Channel Control Unit)

The storage device system 600 in accordance with the present embodiment, as mentioned above, uses the channel control units CHN110 to receive a file access request from the first to third information processing systems 200, and it provides the first to third information processing systems 200 with NAS service.

Figure 7:
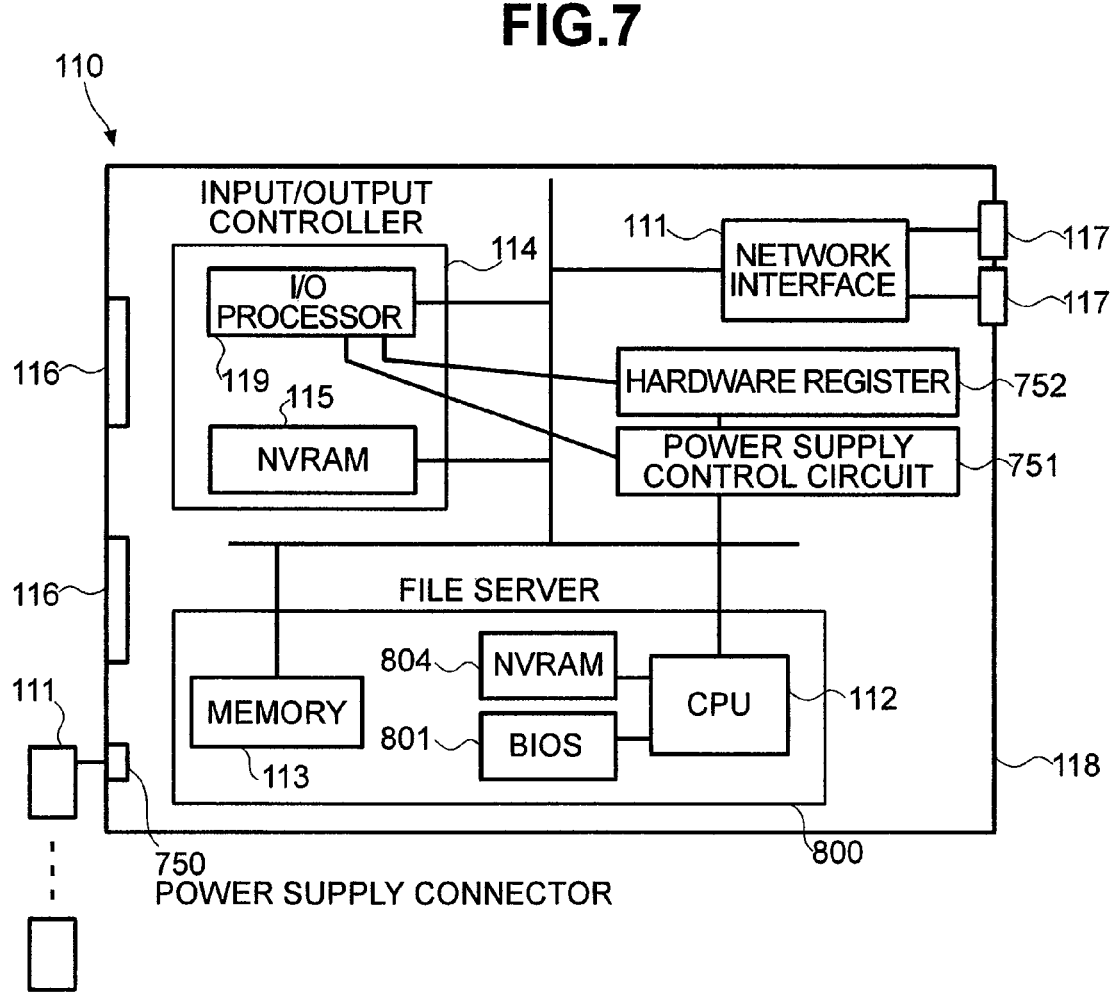
FIG. 7 is a block diagram which shows the hardware configuration of a channel control unit CHN included in the embodiment.

FIG. 7 shows the hardware configuration of the channel control units CHN110. As illustrated, the hardware of each channel control unit CHN110 is one unit that will be referred to as an NAS board. The NAS board includes one circuit board or a plurality of circuit boards. More particularly, the NAS board accommodates a network interface 111, an input/output controller 114, board coupling connectors 116, communication connectors 117, and a file server 800. These circuit elements are integrated into one unit. Furthermore, the input/output controller 114 includes a nonvolatile RAN (NV-RAN) 115 and an input/output (I/O) processor 119.

Power is supplied from the power supplies 111 included in the storage device system 600 to each of the channel control units CHN110 via a power supply connector 750. Each of the channel control units CHN110 includes a power supply control circuit 751 and a hardware register 752 that controls the power supply control circuit 751. When values are specified in the hardware register as if it is to be programmed, the start or disconnection of the power supply to the input/output controller 114 and file server 800 can be controlled. Aside from the control of power supply or the start or discontinuation of power supply, hardware-like actions, including rebooting of the input/output controller 114 or file server 800, or shift to a diagnosis mode, can be controlled by modifying the values specified in the hardware register 752. Consequently, the I/O processor 119 in the input/output controller can control, like hardware, the start or disconnection of power supply to the CPU 112 included in the file server 800, the rebooting, or the shift to the diagnosis mode. Alternatively, the CPU 112 in the file server 800 may control the start or disconnection of power supply to the I/O processor 119 in the input/output controller, the rebooting, and the shift to the diagnosis mode.

The network interface 111 includes a communication interface through which the channel control unit communicates with the information processing systems 200. Each of the channel control units CHN110 receives a file access request sent from any of the information processing systems 200 according to, for example, a TCP/IP protocol. Communication connectors 117 are connectors through which the channel control unit communicates with the information processing systems 200. The communication connectors 117 included in each of the channel control units CHN110 are connectors through which the channel control units CHN110 can be connected on the LAN 400, and which are conformable to the Ethernet®.

The file server 800 includes a CPU 112, a memory 113, a basic input/output system (BIOS) 801, and a nonvolatile RAM 804. The CPU 112 is responsible for control to be extended in order to allow the channel control unit CHN110 to act as a NAS board. The CPU 112 controls a file sharing protocol, such as the NFS (which stands for network file system) or CIFS (which stands for common Internet file system) and a TCP/IP protocol. The CPU 112 analyzes a file access request that designates a file, converts data, which is treated in units of a file, into control information stored in the memory 113 using a conversion table (not shown) that lists the data in relation to the LUs defined in the storage devices 300. Moreover, the CPU 112 produces a data writing or reading request that requests writing or reading of data in or from an LU defined in the storage devices 300, or transmits the data writing or reading request to the I/O processor 119. The BIOS 801 is software that, when the power supply of the own channel control unit CHN110 is turned on, is loaded in the memory 113 and executed first in the course of activating the CPU 112. The BIOS 801 is stored in a nonvolatile medium, for example, a flash memory, and it is included in the channel control unit CHN110. The CPU 112 executes software translated by the BIOS 801 and stored in the memory 113 so as to initialize or diagnose relevant components. Furthermore, the CPU 112 issues a directive such as a command to the I/O processor 119 via the BIOS 801 so as to store a predetermined program, for example, a boot for loading an OS in the memory 113. The boot for loading an OS places a major portion of the OS stored in the storage devices 300 in the memory 113, whereby the OS is activated in the CPU 112. Consequently, the CPU 112 can perform processing to allow the channel control unit CHN110 to act as a file server. Moreover, the file server 800 has the nonvolatile RAM 804 in which a network boot loader conformable to the PXE (which stands form preboot execution environment) standard or the like is stored, and it can perform network booting that will be described later.

Figure 8:
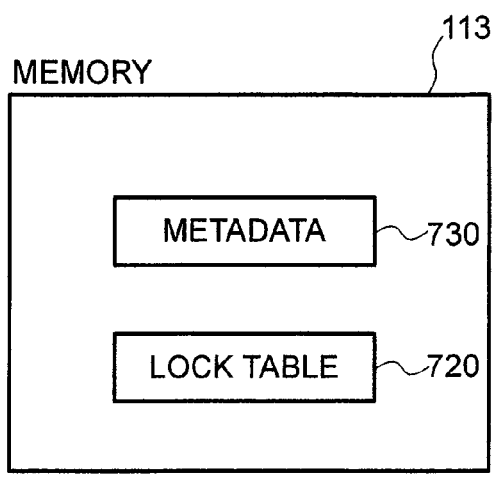
FIG. 8 is a diagram illustrating the contents of data stored in a memory included in the embodiment.
Figure 16:
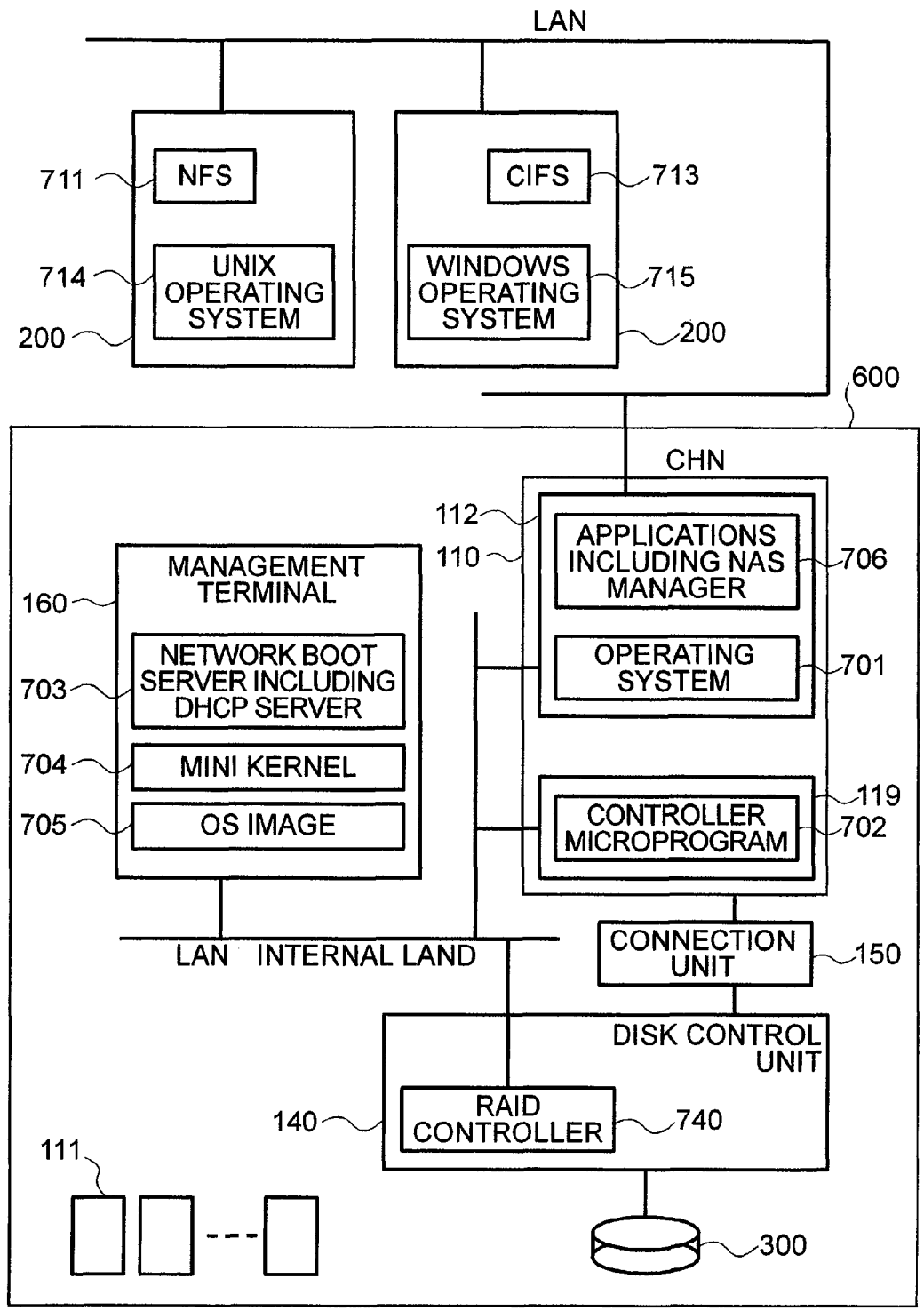
FIG. 16 is a block diagram which shows the software configuration of the storage device system in accordance with the embodiment.

Various programs and data items are stored in the memory 113. Various programs, for example, metadata 730 and a lock table 720, as shown in FIG. 8, and an NAS manager 706, as shown in FIG. 16, are stored in the memory 113. The metadata 730 is information produced in association with a file managed by a file system. The metadata 730 contains, for example, an address in a LU in which the data in a file is stored, the data size, and other information specifying the storage place of the file. The metadata 730 may contain information of a file size, an owner, and a time instant of update. Moreover, the metadata 730 may be produced in association not only with a file but also with a directory. FIG. 9 shows an example of the metadata 730. The metadata 730 is stored in the LUs defined in the storage devices 300.

The lock table 720 is a table used to exclusively control access to a file gained by the first to third information processing systems 200. The exclusive control enables the first to third information processing systems 200 to share the same file. FIG. 10 shows the lock table 720. As shown in FIG. 10, the lock table 720 includes a file lock table 721 and an LU lock table 722. The file lock table 721 is a table indicating whether a file is locked. If a certain file is opened by any of the information processing systems 200, the file is locked. The other information processing systems 200 are inhibited from accessing the locked file. The LU lock table 722 is a table indicating whether each LU is locked. If any of the information processing systems 200 accesses a certain LU, the LU is locked. The other information processing systems 200 are inhibited from accessing the locked LU.

The input/output controller 114 transfers data or a command to or from the disk control units 140, the cache memory 130, the common memory 120, and the management terminal 160. The input/output controller 114 includes the I/O processor 119 and nonvolatile RAM 115. The I/O processor 119 is formed with, for example, a microcomputer implemented in one chip. The I/O processor 119 controls transfer of a data writing or reading request, which is issued to an LU defined in the storage devices 300, and data, and it relays communication between the CPU 112 and disk control units 140. The nonvolatile RAM 115 is a nonvolatile memory in which a program based on which the I/O processor 119 extends control are stored. The contents of the program stored in the nonvolatile RAM 115 are written or rewritten in response to a directive issued from the management terminal 160 or the NAS manager 706 that will be described later.

Figures 11, 12:
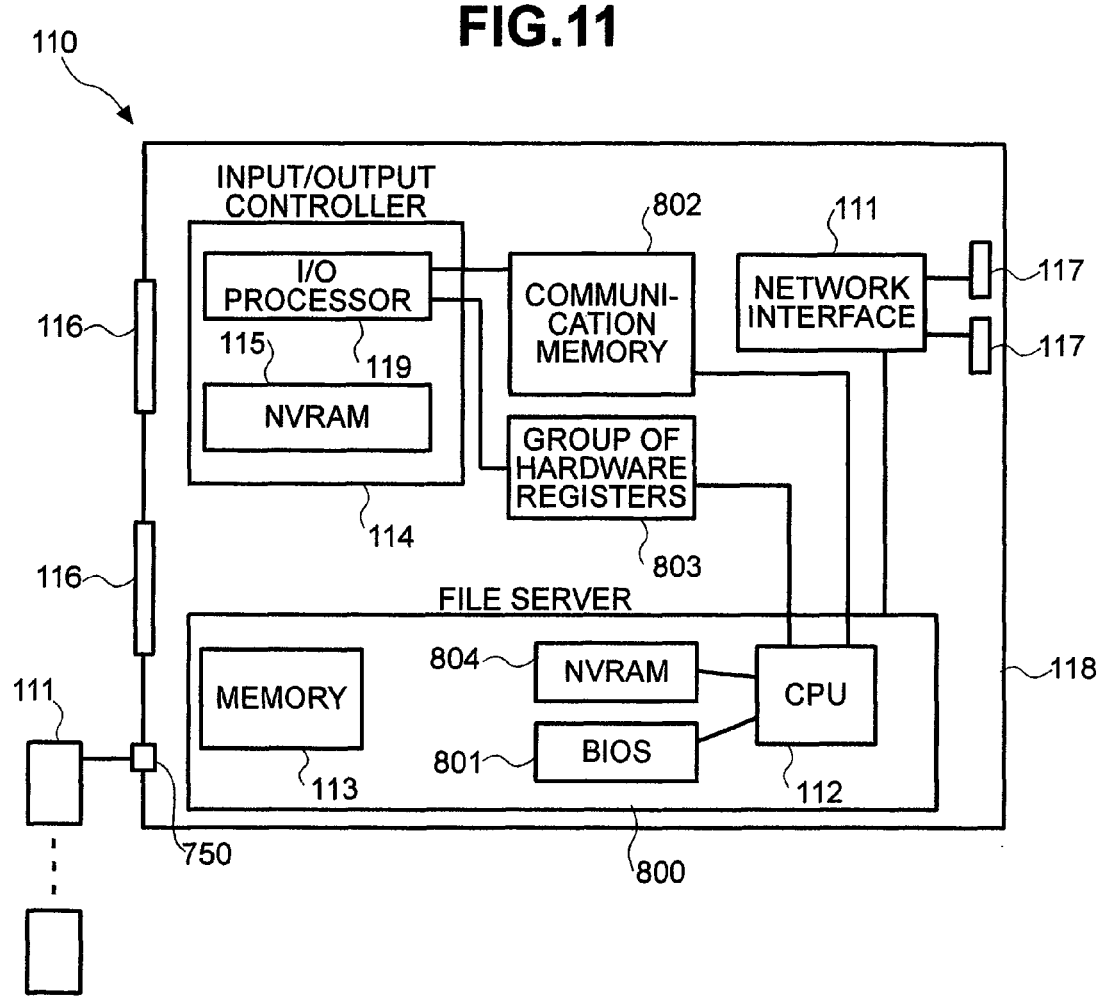
FIG. 11 is block diagram which shows a communication path linking a CPU and an I/O processor, which are included in the channel control unit CHN included in the embodiment.
FIG. 12 is a diagram which shows data to be transferred from the I/O processor to the CPU according to the embodiment.

FIG. 11 shows a specific example of a communication path between the CPU 112 and I/O processor 119 included in each of the channel control units CHN110. The I/O processor 119 and CPU 112 are physically connected to each other via a communication memory 802 and a group of hardware registers 803 included in the channel control unit CHN110. The communication memory 802 and group of hardware registers 803 are accessible to either the CPU 112 or I/O processor 119. The group of hardware registers 803 is connected to a circuit that starts or discontinues power supply to the CPU 112. Consequently, the I/O processor 119 accesses the group of hardware registers 803, whereby the power supply of the CPU 112 can be controlled via the group of hardware registers 803. When the CPU 112 or I/O processor 119 accesses the group of hardware registers 803, the group of hardware registers 803 produces, if necessary, an interrupt signal or the like to an entity that is an object of access so as to communicate the fact that the group of hardware registers has been accessed. The group of hardware registers 803 has a plurality of capabilities including the capability to indicate that the group of hardware registers has been accessed. The plurality of capabilities is assigned to respective registers constituting the group of hardware registers 803 on a hardware basis.

Figure 13:
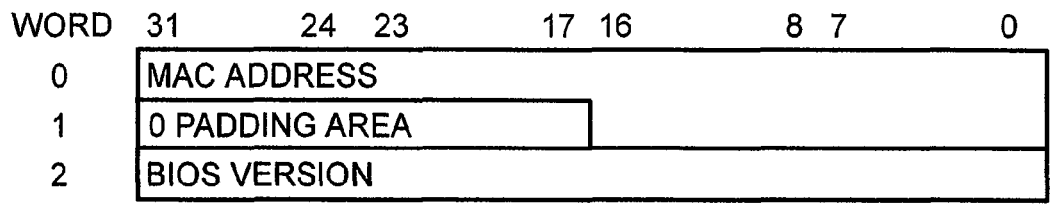
FIG. 13 is a diagram which shows data to be transferred from the CPU to the I/O processor according to the embodiment.

FIG. 12 and FIG. 13 show examples of a data structure stored in the communication memory 802 included in each of the channel control units CHN110. FIG. 12 shows a data structure used to transfer information from the I/O processor 119 to the CPU 112. FIG. 13 shows a data structure used to transfer information from the CPU 112 to the I/O processor 119. Information to be transferred between the CPU 112 and I/O processor 119 is a group of information items to be transferred when the CPU 112 and I/O processor 119 are activated in responsive to start of power supply or the like.

Information to be transferred from the I/O processor 119 to the CPU 112 includes a type of activated device, a diagnosis execution flag, a plurality of drive numbers, time instant information, the number of command retries, a command timeout value, and a plurality of temperature information items. The type of activated device refers to the type of device that is activated in response to a command translated by the BIOS 801 when the CPU 112 is activated. The type of activated device is, for example, "network" or "disk drive." The drive number is a number with which a disk drive in which an OS is loaded is selected when the type of activated device is "disk drive." According to the present embodiment, the concept of a LU is introduced into the storage devices 300. The OS or the like is stored in an LU. Therefore, an LU number assigned to each LU is regarded as the drive number. Priorities are assigned to the drive numbers. Assuming that drive number 0 has priority over drive number 1, the CPU 112 first attempts to activate the LU that has been assigned drive number 0. If the CPU 112 fails in the activation, the CPU 112 attempts to activate the LU that has been assigned drive number 1. When the CPU 112 is activated, the I/O processor 119 uses the diagnosis execution flag to direct the BIOS 801 to execute hardware diagnosis for the peripheries of the file server 800. For example, when initialization of the file server 800 is completed, if the CPU 112 alone is reactivated, the BIOS 801 need not re-execute hardware diagnosis. In this case, when the I/O processor 119 appropriately sets the diagnosis execution flag, the CPU 112 is prevented from re-executing hardware diagnosis for the file server 800. The CPU 112 uses the time instant information when the BIOS 801 or OS is run in the CPU 112. The I/O processor 119 acquires the time instant information from the management terminal 160, and hands it to the CPU 112. Consequently, the management terminal 160, I/O processor 119, and CPU 112 can share the same time instant information. The number of command retries and the command timeout value are treated as conditions. The number of command retries refers to the number of times by which the BIOS 801 or OS residing in the CPU 112 retries a command when the command issued from the CPU 112 to the I/O processor 119 fails. The command timeout value refers to a timeout. The temperature information is a value specified for the CPU 112 so that the CPU 112 can sense an abnormality in a temperature change thereof.

According to the present embodiment, the I/O processor 119 can freely determine the type of activated device, the drive numbers, the time instant information, the number of command retries, the command timeout value, and the plurality of temperature information items. The present embodiment is not limited to this mode. Alternatively, these values may be stored as initial values in the nonvolatile memory in which the BIOS is stored. Otherwise, an operator may enter the values at the management terminal 160 or the values may be registered in the memory included in the management terminal 160 in advance so that the management terminal 160 can hand the values to the I/O processor 119. The diagnosis execution flag is set based on a logical judgment made during activation of the I/O processor 119 or by the operator. Then the diagnosis execution flag is set based on a logical judgment made during activation of the I/O processor 119, the actions of the CPU 112 or the run of the BIOS 801 loaded in the CPU 112 can be controlled by the I/O processor 119.

FIG. 13 shows a data structure used to transfer information from the CPU 112 to the I/O processor 119. A BIOS version specifies the version of an object code produced by the BIOS 801. The BIOS version is transferred from the CPU 112 to the I/O processor 119, and from the I/O processor 119 to the management terminal 160. A MAC address specifies a MAC (which stands for media access control) address in the CPU 112. The MAC address is a unique identifier assigned to hardware, and it is needed to assign an IP address required by the IP protocol to a DHCP (which stands for dynamic host configuration protocol) server on a LAN. 0 padding information is needed to fill out a word and has nothing to do with information.

Figure 14:
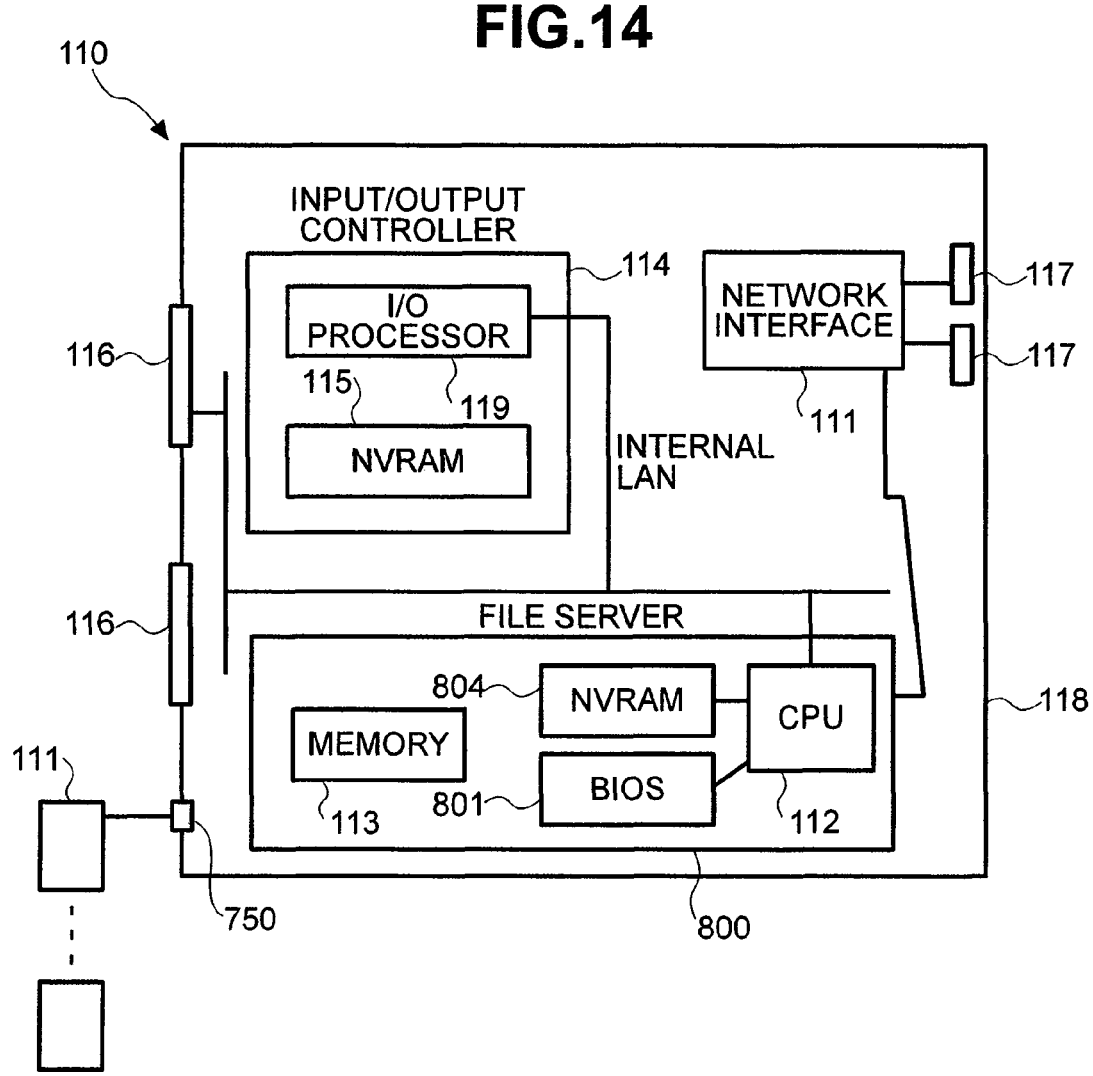
FIG. 14 is a block diagram which shows the hardware configuration of the channel control unit CHN, which is included in the embodiment and which has an internal LAN.

FIG. 14 shows the hardware configuration in which the CPU 112 and I/O processor 119 are connected to each other over the internal LAN 151. As illustrated, the CPU 112 and I/O processor 119 are also connected to each other over the internal LAN 151, and, therefore, they can communicate with the management terminal 160 over the internal LAN 151. Consequently, for example, the CPU 112 runs the network boot loader which has been stored in advance in the nonvolatile RAM 804, so as to download activation software from the management terminal 160 into the memory 113 and execute the activation software. Eventually, a network booting process is executed with the management terminal 160 being used as a server and the CPU 112 being used as a client. Network booting is a method according to which: a network boot loader in a client and the management terminal 160 acting as a server activate and execute a boot residing in the management terminal 160 on a LAN for the purpose of loading an OS according to the combination of the IP protocol and the protocols of DHCP, TFTP (which stands for trivial file transfer protocol), and FTP (which stands for file transfer protocol) on the basis of, for example, the PXE standard or the like.

Figure 15:
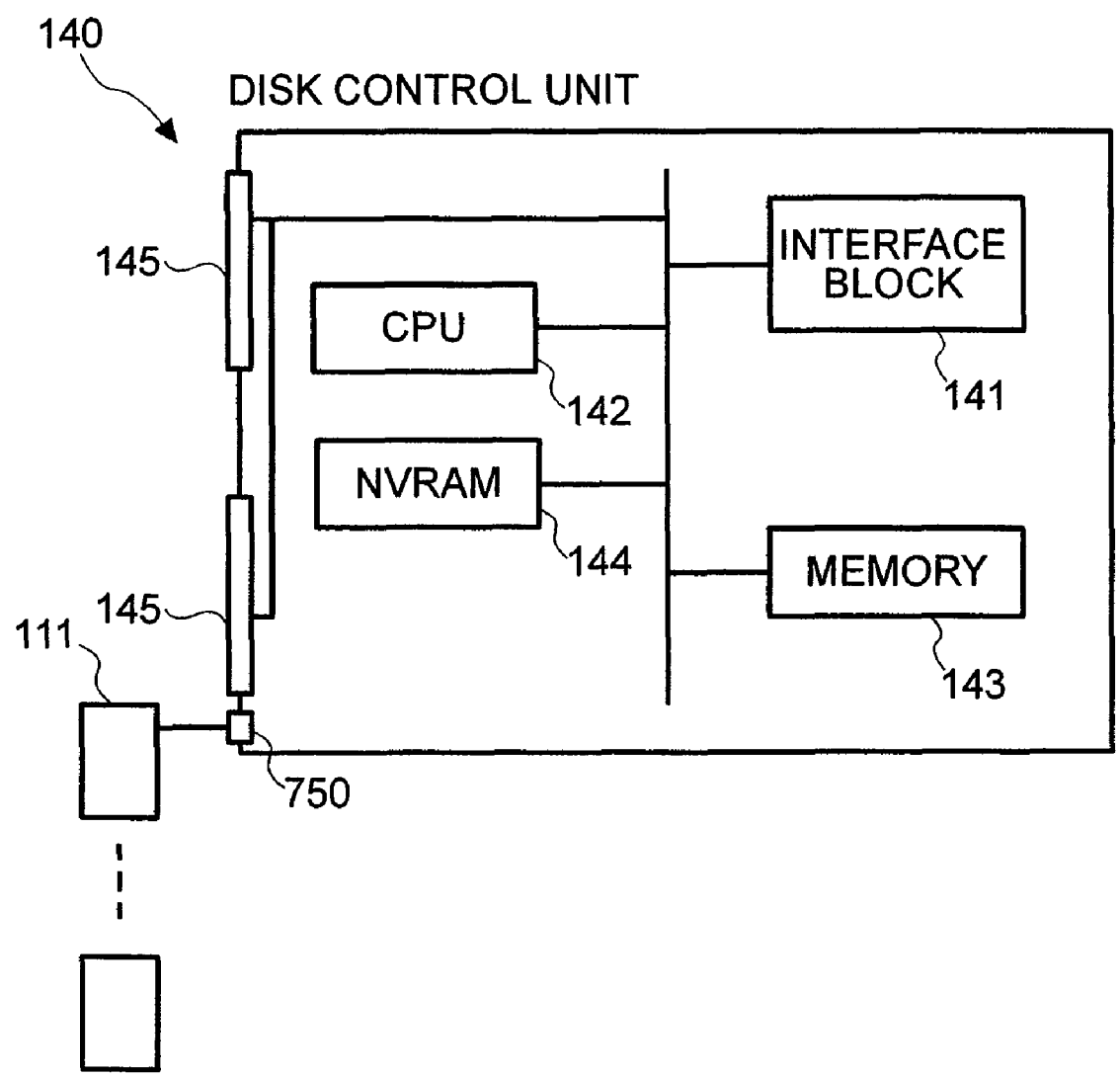
FIG. 15 is a block diagram which shows a disk control unit included in the embodiment.

FIG. 15 is a block diagram showing the hardware configuration of each of the disk control units 140. As already described, the disk control units are connected to the storage devices 300, and they are also connected to the channel control units CHN110 via the connection unit 150. The disk control units 140 read or write data from or in the storage devices 300 by themselves or under the control of the channel control units CHN110.

Each of the disk control units 140 comprises an interface block 141, a memory 143, a CPU 142, a nonvolatile RAN 144, and board coupling connectors 145, which are integrated into a unit.

The interface block 141 includes a communication interface through which the disk control unit communicates with the channel control units 110 via the connection unit 150, a communication interface through which the disk control unit communicates with the storage devices 300, and a communication interface through which the disk control unit communicates with the management terminal 160 over the internal LAN 151.

The CPU 142 is responsible for control of the entire disk control unit 140, and it communicates with the channel control units 110, storage devices 300, and management terminal 160. Various programs stored in the memory 143 and nonvolatile RAM 144 are run, whereby the features of the disk control units 140 included in the present embodiment are implemented. The features implemented in the disk control units 140 include control of the storage devices 300, control of a RAID, management of a duplicate of data stored in the storage devices 300, backup control, and control of remote control.

The nonvolatile RAM 144 is a nonvolatile memory in which a program according to which the CPU 142 extends control is stored. The contents of the program stored in the nonvolatile RAM 144 are written or rewritten in response to a directive given at the management terminal 160 or issued from the NAS manager 706.

Moreover, each of the disk control units 140 includes the board coupling connectors 145. When the board coupling connectors 145 are mated with respective connectors formed on the storage device control system 100, each of the disk control units 140 is electrically connected to the storage device control system 100.

(Software Configuration Diagram)

FIG. 16 shows the software configuration of the storage device system 600 in accordance with the present embodiment. As already described, the CPU 112 and I/O processor 119 are included in each of the channel control units CHN110. The number of CPUs 112 and the number of I/O processors 119 may be one, or a plurality of CPUs 112 and a plurality of I/O processors 119 may be included. An OS 701 and diverse applications, including the NAS manager 706, are run in the CPU 112, whereby the CPU 112 acts as an NAS server. A microprogram implementing a controller is run in the I/O processor 119. A RAID controller 740 runs in the CPU 142 included in each of the disk control units 140. The CPU 161 included in the management terminal 160 acts as a network boot server 703. The network boot server 703 transfers a mini kernel 704 and an OS image 705 from the storage medium 167 or storage device 168 thereof to the CPUs 112 included in the channel control units CHN110 over the internal LAN 151. The network boot server 703 includes, for example, a DHCP (which stands for dynamic host configuration protocol) server. The network boot server 703 assigns an IP address or a MAC address to each of the CPUs 112 and the I/O processors 11 included in the channel control units CHN110, and to the CPU 161, and it enables transfer between the management terminal 160 and the CPUs 112 or between the CPU 161 and the I/O processors 119. For network booting, for example, the CPUs 112 act as a client and issue a DHCP request or a file transfer request to the network boot server 703. After the network booting is completed, the CPUs 112 each execute the mini kernel 704. Finally, each of the CPUs 112 installs the OS image 705 in the storage devices 300 via the I/O processor 119.

FIG. 16 also shows the software configuration of each of the information processing systems 200. Some of the information processing systems 200 adopt a network file system (NFS) 711, and the other information processing systems 200 adopt a common Internet file system (CIFS) 713. The NFS 711 is a file sharing protocol adopted mainly by a UNIX® operating system 714, while the CIFS 713 is a file sharing protocol adopted mainly by a Windows® operating system 715.

(Activation and Installation Performed by the Storage Device System)

A description will be made of a procedure according to which the channel control units CHN110 are activated with power supplied thereto. By following the activating procedure, the channel control units CHN110 each act as a NAS server. In order to supply power to the channel control units CHN110, for example, after the channel control units CHN110 are inserted into the storage device system 600, the power supply of the storage device system 600 itself is turned on. Otherwise, the channel control units CHN110 are inserted into the storage device system 600 whose power supply has already been turned on, whereby power is supplied from the storage device system 600 to the power supply circuits included in the channel control units CHN110. Thus, power may be supplied to the channel control units CHN110. The former procedure, in which, after the channel control units CHN110 are inserted into the storage device system 600, the power supply of the storage device system 600 itself is turned on, will be described below.

FIG. 17 illustrate the flow ranging from a step of turning on the power supply of the storage device system 600; through a step of installing the OS image 705 from the management terminal 160 to the storage devices 300, to a step of activating the OS installed in the storage devices 300 so that the storage device system 600 will act as an NAS system. FIG. 17 lists the actions of the CPUs 112, I/O processors 119, management terminal 160, and storage devices 300 while associating them with one another. Time passes from above to below in the drawing. In the drawing, arrows drawn with solid lines indicate transmission of control information, and arrows drawn with dot lines indicate flows of data.

A description will be made according to the sequence operations.

To begin with, the power supply of the storage device system 600 is turned on (step 1 for the CPUs 112, step 1 for the I/O processors 119, step 1 for the management terminal 160, step 1 for the storage devices 300). In response thereto, the CPUs 112 autonomously start activating the respective BIOS5 (step 2 for the CPUs 112). The I/O processors 119 initialize the hardware of the channel control units CHN110 (step 2 for the I/O processors 119). The management terminal 160 activates the OS and software installed thereon (step 2 for the management terminal 160). The storage devices 300 activate the respective disk drives which spin the disks (step 2 for the storage devices 300). When the disk drives spin the disks, physically rotational movements, stability of the rotational movements, and hardware diagnosis are carried out. The spinning therefore requires some time. Herein, the spinning is completed at the timing at which the CPUs 112 perform activation for the second time (step 8 for the storage devices 300).

According to the present embodiment, since the power supply of the entire storage device system 600 is turned on, power is simultaneously supplied to all of the CPUs 112, I/O processors 119, management terminal 160, and storage devices 300. The present embodiment is not limited to this mode. For example, when the power supply of the storage device system 600 has already been turned on, if a new channel control unit CHN110 is added to the storage device system 600, power is not supplied to the CPU 112 and I/O processor 119 included in the channel control unit CHN110 until the power supply connector 750 of the channel control unit CHN110 is coupled to the storage device system 600. In this case, it is assumed that the disk drives have already been activated and the disks have already been spun, and so extra control need not be extended. Nevertheless, the I/O processors 119 verify at step 12 that the disk drives have already spun the disks, and immediately pass control to the next step 13. For example, when power supply to the management terminal 160 alone is discontinued because of maintenance or the like, even if a new channel control unit CHN110 is added to the storage device system 600, the I/O processors 119 cannot communicate with the management terminal 160 at step 10. In this case, the I/O processors 119 repeat step 10 regularly until the power supply of the management terminal 160 is turned on again. Otherwise, an emergency alarm LED included in the storage device system 600 or a communication line may be used to notify a maintenance engineer or the like of the fact that the power supply of the management terminal 160 should be turned on. Thus, the maintenance engineer or the like may be prompted to turn on the power supply of the management terminal 160 so that control can be passed to the next step.

In each of the CPUs 112, the BIOS 801 waits for a directive issued from the I/O processor 119 (step 3 for the CPUs 112). When initialization of the I/O processor 119 and initialization of the hardware of the channel control unit CHN110 are completed, a diagnosis start request is issued to the CPU 112 in order to direct the start of hardware diagnosis (step 4 for the I/O processors 119). At this time, the diagnosis start request is transmitted using either the communication memory 802 or the group of hardware registers 803 or both of them.

When the CPUs 112 detect the diagnosis start request, the CPUs 112 start diagnosing the hardware (step 4 for the CPUs 112). When hardware diagnosis is completed (step 5 for the CPUs 112), the CPUs 112 store respective MAC addresses, which are assigned to the internal LAN 151 ports thereof, in the respective communication memories 802 (step 6 for the CPUs 112). When the I/O processors 119 sense that the MAC addresses have been stored in the respective communication memories 802 (step 6 for the I/O processors 119), the I/O processors 119 access the respective groups of hardware registers 803 so as to issue a CPU reset directive. Consequently, the CPUs 112 are physically reset (step 7 for the I/O processors 119). Consequently, after power supply to the CPUs 112 is discontinued temporarily, the power supply is restarted (step 7 for the CPUs 112). The CPUs 112 reactivate the respective BIOS5 (step 8 for the CPUs 112) and wait for a directive issued from the respective I/O processors 119 (step 9 for the CPUs 112).

When the management terminal 160 completes activation, it starts installation. An operator may perform the installation, or the installation may be executed under the control of the CPU 161 according to a predefined program. Hereinafter, an operator shall perform the installation, and the CPU 161 included in the management terminal 160 shall perform processing according to an entry the operator made at the input device 165. After the installation is started, the management terminal 160 queries the I/O processors 119 about the MAC addresses, and it receives the MAC addresses assigned to the CPUs 112 from the I/O processors 119 (step 10 for the management terminal 160). The operator enters and determines the number of command retries to be permitted after activation of the OS, a timeout value, and temperature information (step 11 for the management terminal 160). These values entered by the operator are transmitted from the management terminal 160 to the I/O processors 119 included in the channel control units CHN110 over the internal LAN 151. The operator directs the management terminal 160 to install a new OS. When the operator specifies a network boot disk as a type of activated device, the OS installation directive is transmitted from the management terminal 160 to the I/O processors 119 (step 11 for the management terminal 160).

In response to the OS installation directive, the I/O processors 119 verify whether the disk drives in the storage devices 300 have spun the disks so as to judge whether the storage devices 300 are usable (step 12 for the I/O processors 119). Since the disk drives in the storage devices 300 have already spun the disks (step 8 for the storage devices 300), the I/O processors 119 detect whether the disk drives have completed spinning the disks (step 13 for the I/O processors 119). If it cannot be detected that the disk drives have completed spinning the disks, the I/O processors 119 return an error response to the management terminal 160 so as to indicate that the disk drives have not spun the disks. If the I/O processors 119 detect that the disk drives have completed spinning the disks, the I/O processors 119 store, in addition to the temperature information, a number of command retries, a retry timeout value received from the management terminal 160, a diagnosis execution flag and a type of activated device in the respective communication memories 802 (step 14 for the I/O processors 119. Since hardware diagnosis has already been completed (at step 4 and step 5 for the CPUs 112), it is unnecessary to perform hardware diagnosis again. Consequently, the I/O processors 119 set the diagnosis execution flag to a value that directs skipping of hardware diagnosis. Moreover, the CPUs 112 must install the OS image 705 existent in the management terminal 160 into the storage devices 300 during activation after the CPUs 112 wait for a directive sent from the respective I/O processors. Consequently, the I/O processors 119 specify a network boot disk as the type of activated device and store the type of activated device in the respective communication memories 802 (step 14 for the I/O processors 119). When various information items are stored in the communication memories 802, the I/O processors 119 access the respective groups of hardware registers 803 and notify the respective CPUs 112 of the fact that the information items have been stored (step 15 for the I/O processors 119). The notification is intended to direct the CPUs 112 to execute processing.

The CPUs 112 sense whether the respective I/O processors 119 have issued a directive that processing should be continued (step 15 for the CPUs 112). The CPUs 112 acquire the temperature information, number of command retries, retry timeout value, diagnosis execution flag, and type of activated device from the respective communication memories 802 (step 16 for the CPUs 112). Since a network boot disk is specified as the type of activated device, the CPUs 112 start network booting (step 17 for the CPUs 112). Network booting progresses along with data communication over the internal LAN 151 between the boot loader running in each of the CPUs 112 and the network boot server 703 implemented in the management terminal 160. The network boot server 703 uses the MAC address information of each of the CPUs 112 (acquired at step 10 for the management terminal 160) to communicate with the boot loader. The CPUs 112 issue a network boot request to the network boot server 703 implemented in the management terminal 160 according to the PXE (which stands for preboot execution environment) standard (step 18 for the CPUs 112). The management terminal 160 receives the network boot request over the internal LAN 151 (step 18 for the management terminal 160). During network booting, the CPUs 112 act as network boot clients (step 19 for the CPUs 112). On the other hand, the management terminal 160 acts as the network boot server (step 19 for the management terminal 160). As a result of communication performed during network booting, the management terminal 160 allows the CPUs 112 to download the mini kernel 704. The mini kernel 704 downloaded into each of the CPUs 112 permits transfer of the OS image 705, which resides in the management terminal 160, to the storage devices 300 (step 20 for the CPUs 112). The OS image 705 is installed in the storage devices by way of the I/O processors 119, cache memory 130, and disk control units 140 under the control of the CPUs 112 included in the channel control units CHN110. After the installation is completed, the CPUs 112 issue an installation completion notification to the respective I/O processors 119 (step 21 for the CPUs 112). Then the I/O processors 119 detect the installation completion notification (step 21 for the I/O processors 119), the I/O processors access the respective groups of hardware registers 803 so as to issue a CPU reset directive, and thus reset the respective CPUs 112 (step 22 for the I/O processors 119). Consequently, power is re-supplied to the CPUs 112 (step 22 for the CPUs 112). The CPUs 112 reactivate the respective BIOS5 801 (step 23 for the CPUs 112), and wait for a directive sent from the I/O processors 119 (step 24 for the CPUs 112).

The I/O processors 119 store time instant information, a type of activated device, and activated drive number information in the respective communication memories 802 (step 25 for the I/O processors 119). In this case, the I/O processors 119 specify a disk drive as the type of activated device. The I/O processors 119 access the respective groups of hardware registers 803 so as to issue a processing continuation directive to the respective CPUs 112 (step 26 for the I/O processors 119).

When the CPUs 112 detect the CPU processing continuation directive (step 26 for the CPUs 112), the CPUs 112 acquire the time instant information from the respective communication memories 802 (step 27 for the CPUs 112), and they issue a command to the respective I/O processors 119. The CPUs 112 thus allow the respective I/O processors 119 to start disk booting (step 28 for the CPUs 112). The CPUs 112 allow the respective I/O processors 119 to load the OS image 705 stored in the storage devices 300 (step 29 for the CPUs 112). In this case, the OS image 705 is loaded from the storage devices 300 to the CPUs 112 by way of the disk control units 140, cache memory 130, and I/O processors 119.

When the OS image 705 is loaded into the CPUs 112, the CPUs 112 pass control from the respective BIOS5 801 to the OS image 705. Consequently, the OS is activated (step 30 for the CPUs 112). This permits the channel control units CHN110 to act as NAS devices and permits the storage device system 600 to act as an NAS system (step 31 for the CPUs 112).

Consequently, according to the present embodiment, when the power supply of the storage device system 600 is turned on, the I/O processors 119 control the respective CPUs 112. This enables installation of a new OS over a network or enables booting for installing the OS. Furthermore, the CPUs 112 and I/O processors 119 included in the respective channel control units 110, the CPU 161 included in the management terminal 160, the CPUs 142 included in the respective disk control units 140, and the storage devices 300 cooperate with one another. Consequently, the storage device system 600 can be activated efficiently for a limited period of time. Moreover, software can be installed efficiently.

The CPUs 112 used as file servers must often be controlled on a hardware basis. Specifically, when the CPUs 112 are activated or an OS is installed in the CPUs 112, the CPUs 112 must be re-booted, and power supply to the CPUs 112 must be started, discontinued, or restarted. This work is performed daily on a normal server computer. A maintenance engineer or a user manually performs the work at any time while looking at a screen image displayed on the operator console. In the storage device system 600 in which the file servers are incorporated in the form of hardware, the servers themselves need not support a special screen image or a user interface to be displayed on the console. Namely, according to a certain procedure like the one employed by the present invention, the above hardware operations are automatically performed according to a program installed in the I/O processors 119 through communications with the I/O processors 119. Consequently, activation of the server's and installation of an OS can be automated. A UNIX or any other general-purpose OS can be adapted to the OS to be installed in the file servers with minimal modification. Since the UNIX or any other general-purpose OS is widely adopted as an OS to be installed in file servers, it is advantageous that the UNIX or any other general-purpose OS can be installed with little modification. Moreover, this leads to a reduction in the period required for development. Furthermore, assuming that the present storage device system is divided into a file server section and a storage device controller section, the storage device controller section that has a close relationship with the disk drives can control booting, OS installation, and other work to be performed by the file server section during a period of time during which the disk drives spin the disks or any other phflical movements are made. In other words, a section of a storage device system whose hardware is restricted, that is, in which the period of time during which disk drives spin disks is restricted, can actively control booting of the entire system or installation as soon as the hardware-related restriction is lifted. From this viewpoint, the storage device system in accordance with the present invention is an efficient and reasonable system.

The present embodiment has been described by taking as an example a method of turning on the power supply of the storage device system 600 itself after the channel control units CHN110 are inserted into the storage device system 600. The present embodiment is not limited to this mode. Alternatively, the channel control units CHN110 may be inserted into the storage device system 600 whose power supply has already been turned on in order to supply power to the channel control units CHN110.

The present embodiment has been described so far. The embodiment is presented for a better understanding of the present invention, but the present invention is not limited to the embodiment. The present invention can be varied or modified without a departure from the gist thereof, and encompasses all equivalents.

According to the present invention, there is provided a novel storage device system that is capable of being connected on a plurality of different types of networks. Furthermore, there are provided a storage device control system and a method of controlling activation of the storage device system which are needed to implement the storage device system.

What is claimed:

1. A storage device system comprising:
   a plurality of storage devices in which information is stored;
   a storage device control section for controlling storage of information in said plurality of storage devices;
   a connection unit connected to said storage device control section;
   a first processor that is connected to an external local area network (LAN), which is external to said storage device system, and that converts data of a file access form received over said external LAN into data of a block access form;
   a second processor that is connected to said storage device control section via said connection unit, that accesses said plurality of storage devices via said connection unit and said storage device control section in response to data of the block access form issued from said first processor, and that controls activation of said first processor including resetting said first processor by said second processor; and
   a management terminal that is connected to the first processor and the second processor via an internal LAN, wherein said resetting said first processor by said second processor includes stopping supplying power to said first processor, re-supplying power to said first processor and activating a Basic Input/Output System (BIOS) of said first processor, wherein said second processor issues a request for start of hardware diagnosis of said first processor to said first processor, wherein said first processor performs hardware diagnosis in response to the hardware diagnosis start request issued from said second processor, wherein the first processor stores respective media access control (MAC) addresses, which are assigned to ports of the internal LAN, in respective communication memories, wherein the management terminal acquires the MAC addresses assigned to the first processor from the second processor at regular intervals, until the power supply of the management terminal is turned on again, wherein the second processor verifies whether disk drives have spun disks so as to determine whether the storage devices are usable, and detects whether the disk drives have completed spinning the disks, wherein the first processor issues a network boot request to a network boot server implemented in the management terminal, wherein the management terminal receives the network boot request over the internal LAN, and wherein the first processor instructs the second processor to start disk booting.

2. The storage device system according to claim 1, wherein said first processor diagnoses the hardware thereof, wherein said second processor issues a request for start of hardware diagnosis of said first processor to said first processor.

3. The storage device system according to claim 2, wherein said second processor issues a request for start of first processing to said first processor, and wherein said first processor acquires first software from said management terminal in response to the first processing start request issued from said second processor.

4. The storage device system according to claim 3, wherein said first processor acquires second software from said management terminal under the control of the first software acquired from said management terminal, and writes the second software in said plurality of storage devices via said connection unit and said storage device control section.

5. The storage device system according to claim 4, wherein said second processor issues a request for start of second processing to said first processor, wherein said first processor acquires the second software written in said plurality of storage devices via said connection unit and said storage device control section in response to the second processing start request issued from said second processor.

6. The storage device system according to claim 3, wherein both the first processing start request and second processing start request contain time instant information.

7. The storage device according to claim 1, wherein said first and said second processors form part of a first communication control section.

8. The storage device system according to claim 7, further comprising:

a second communication control section connected on a second network external to said storage device system, wherein said first communication control section is formed with the same circuit board as said second communication control section is.

9. The storage device system according to claim 7, wherein said first communication control section includes a storage device in which third software is stored, wherein said first processor activates the third software so as to activate said first communication control section, and waits for a request issued from said second processor.

10. The storage device system according to claim 9, further comprising:

a second communication control section that is connected on a second network external to said storage device system, wherein said first communication control section is formed with the same circuit board as said second communication control section.

11. The storage device system according to claim 10, wherein said first processor diagnoses the hardware thereof, and wherein said second processor issues a request for start of hardware diagnosis of said first processor to said first processor.

12. The storage device system according to claim 11, further comprising:

a management terminal connected to each of said first communication control section and said second communication control section, wherein said second processor issues a request for start of first processing to said first processor, and wherein said first processor acquires first software from said management terminal in response to the first processing start request issued from said second processor.

13. The storage device system according to claim 12, wherein said first processor acquires second software from said management terminal under the control of the first software acquired from said management terminal, and writes the second software in said plurality of storage devices via said connection unit and said storage device control section.

14. The storage device system according to claim 13, wherein said second processor issues a request for start of second processing to said first processor, and wherein said first processor acquires the second software written in said plurality of storage devices via said connection unit and said storage device control section in response to the second processing start request issued from said second processor.

15. The storage device system according to claim 12, wherein both said first processing start request and said second processing start request contain time instant information.

16. A method of activating a storage device system, wherein the storage device system comprises a plurality of storage devices in which information is stored, a storage device control section which controls storage of information in said plurality of storage devices, a connection unit connected to said storage device control section, a first processor that is connected to an external local area network (LAN), which is external to said storage device system and that converts data of a file access form received over said LAN into data of a block access form, a second processor that is connected to said storage device control section via said connection unit, and that accesses said plurality of storage devices via said connection unit and said storage device control section in response to the data of the block access form issued from said first processor, and a management terminal that is connected to the first processor and the second processor via an internal LAN, said method comprising the steps of:

controlling, by said second processor, activation of said first processor including resetting said first processor by said second processor, wherein said resetting said first processor by said second processor includes stopping supplying power to said first processor, re-supplying power to said first processor and activating a Basic Input/Output System (BIOS) of said first processor;

issuing, by said second processor, a request for start of hardware diagnosis of said first processor to said first processor;

performing, by said first processor, hardware diagnosis in response to the hardware diagnosis start request issued from said second processor;

storing, by the first processor, respective media access control (MAC) addresses, which are assigned to ports of the internal LAN, in respective communication memories;

acquiring, by the management terminal, the MAC addresses assigned to the first processor from the second processor at regular intervals, until the power supply of the management terminal is turned on again;

verifying, by the second processor, whether disk drives have spun disks so as to determine whether the storage devices are usable, and detecting, by the second processor, whether the disk drives have completed spinning the disks;

issuing, by the first processor, a network boot request to a network boot server implemented in the management terminal;

receiving, by the management terminal, the network boot request over the internal LAN; and instructing, by the first processor, the second processor to start disk booting.

17. The method according to claim 16, said method further comprising the steps of:

issuing, by said second processor, a request for start of first processing to said first processor; and acquiring, by said first processor, first software from said management terminal in response to the first processing start request issued from said second processor.

18. The method according to claim 17, further comprising the steps of:

acquiring, by said first processor, second software from said management terminal under control of the first software acquired from said management terminal, and writing the second software in said plurality of storage devices via said connection unit and said storage device control section.

19. The method according to claim 18, further comprising the steps of:

issuing, by said second processor, a request for start of second processing to said first processor; and acquiring, by said first processor, the second software written in said plurality of storage devices via said connection unit and said storage device control section in response to the second processing start request issued from said second processor.

* * * * *